(12) United States Patent
Ibrahim et al.

(10) Patent No.: US 7,295,528 B2
(45) Date of Patent: Nov. 13, 2007

(54) PEER TO PEER WIRELESS COMMUNICATION CONFLICT RESOLUTION

(75) Inventors: Brima B. Ibrahim, Aliso Viejo, CA (US); Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 831 days.

(21) Appl. No.: 10/770,185

(22) Filed: Feb. 2, 2004

(65) Prior Publication Data

US 2004/0240404 A1 Dec. 2, 2004

Related U.S. Application Data

(60) Provisional application No. 60/469,983, filed on May 13, 2003.

(51) Int. Cl.
*H04B 7/00* (2006.01)
*H04Q 7/00* (2006.01)
(52) U.S. Cl. .................. 370/310; 370/328; 370/394
(58) Field of Classification Search ............. 370/310, 370/312, 328, 338, 344, 352, 394
See application file for complete search history.

(56) References Cited

U.S. PATENT DOCUMENTS

| 5,274,702 | A  | * | 12/1993 | Rosch et al. | 379/399.01 |
| 6,400,695 | B1 | * | 6/2002  | Chuah et al. | 370/310 |
| 6,519,248 | B1 | * | 2/2003  | Valko        | 370/352 |
| 7,068,610 | B2 | * | 6/2006  | Unruh        | 370/252 |
| 7,203,175 | B2 | * | 4/2007  | Thubert et al. | 370/310 |
| 7,218,630 | B1 | * | 5/2007  | Rahman       | 370/355 |

* cited by examiner

*Primary Examiner*—Quochien B. Vuong
(74) *Attorney, Agent, or Firm*—McAndrews, Held & Malloy, Ltd.

(57) ABSTRACT

A method for use by one peer of peer wireless interfaces devices of a wireless communication device to cooperatively provide wireless communications in a multiple wireless communication environment with other peers of the peer wireless interface devices begins by initiating an atomic sequence of a plurality of atomic sequences. The processing continues by setting a priority level corresponding to the atomic sequence to produce a corresponding priority level. The processing continues by sensing priority level of at least one of the other peers to produce a sensed priority level. The processing continues by comparing the sensed priority level with the corresponding priority level. The processing then continues by performing at least a portion of the atomic sequence when the comparing of the sensed priority level with the corresponding priority level is favorable.

19 Claims, 7 Drawing Sheets

PEER TO PEER WIRELESS COMMUNICATION CONFLICT RESOLUTION

This patent application is claiming priority under 35 USC § 119(e) to provisionally filed patent application entitled Coordination of Operation of Common Band Wireless Interface Devices of a Host, having a filing date of May 13, 2003, and a Ser. No. of 60/469,983. This patent application is further claiming priority under 35 USC § 120 to co-pending patent application entitled Cooperative Transceiving Between Wireless Interface Devices of a Host Device, having a filing date of Mar. 12, 2003, and a Ser. No. of 10/387,249.

BACKGROUND OF THE INVENTION

1. Techincal Field of the Invention

This invention relates generally to wireless communication systems and more particularly to cooperative transceiving by wireless interface devices of the same host device.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna. In direct conversion transmitters/receivers conversion directly between baseband signals and RF signals is performed.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As the use of wireless communication devices increases, many wireless communication devices will include two or more radio transceivers, where each radio transceiver is compliant with a different wireless communication standard. For instance, a computer may include two radio transceivers: one for peripheral device interfacing and another for wireless local area network (WLAN) interfacing. Even though the two radio transceivers are compliant with different wireless communication standards, they may occupy the same or similar frequency spectrum, thus will interfere with each other's ability to receive inbound packets. For example, if one radio transceiver is compliant with Bluetooth and the other is compliant with IEEE 802.11(b) or IEEE 802.11(g), both radio transceivers would operate in the 2.4 GHz frequency range.

In this example, if the Bluetooth radio transceiver is receiving a packet and the IEEE 802.11 radio transceiver begins transmitting a packet, the transmission will interfere with the Bluetooth radio transceiver's ability to accurately receive the packet. Similarly, if the IEEE 802.11 radio transceiver is receiving a packet and the Bluetooth radio transceiver begins transmitting a packet, the transmission by the Bluetooth radio will interfere with the IEEE 802.11 radio transceiver's ability to accurately receive the packet. In addition, concurrent transmission by both the IEEE 802.11 radio transceiver and the Bluetooth radio transceiver may cause interference, thus corrupting the one or both transmissions.

Therefore, a need exists for a method and apparatus that provides cooperation between two or more common band wireless interface devices (i.e., radio transceivers) of a host device to substantially eliminate interfere caused by concurrent operations.

BRIEF SUMMARY OF THE INVENTION

The peer to peer wireless communication conflict of the present invention substantially meets these needs and others. In one embodiment, a method for use by one peer of peer wireless interfaces devices of a wireless communication device to cooperatively provide wireless communications in a multiple wireless communication environment with other peers of the peer wireless interface devices begins by initiating an atomic sequence of a plurality of atomic sequences (e.g., an operation, or series of operations, performed by a wireless communication device to participate in a standardized wireless communication). The processing continues by setting a priority level corresponding to the atomic sequence to produce a corresponding priority level. The processing continues by sensing priority level of at least one of the other peers to produce a sensed priority level. The processing continues by comparing the sensed priority level with the corresponding priority level. The processing then continues by performing at least a portion of the atomic sequence when the comparing of the sensed priority level with the corresponding priority level is favorable.

DETAILED DESCRIPTION OF THE INVENTION

Figure 1:
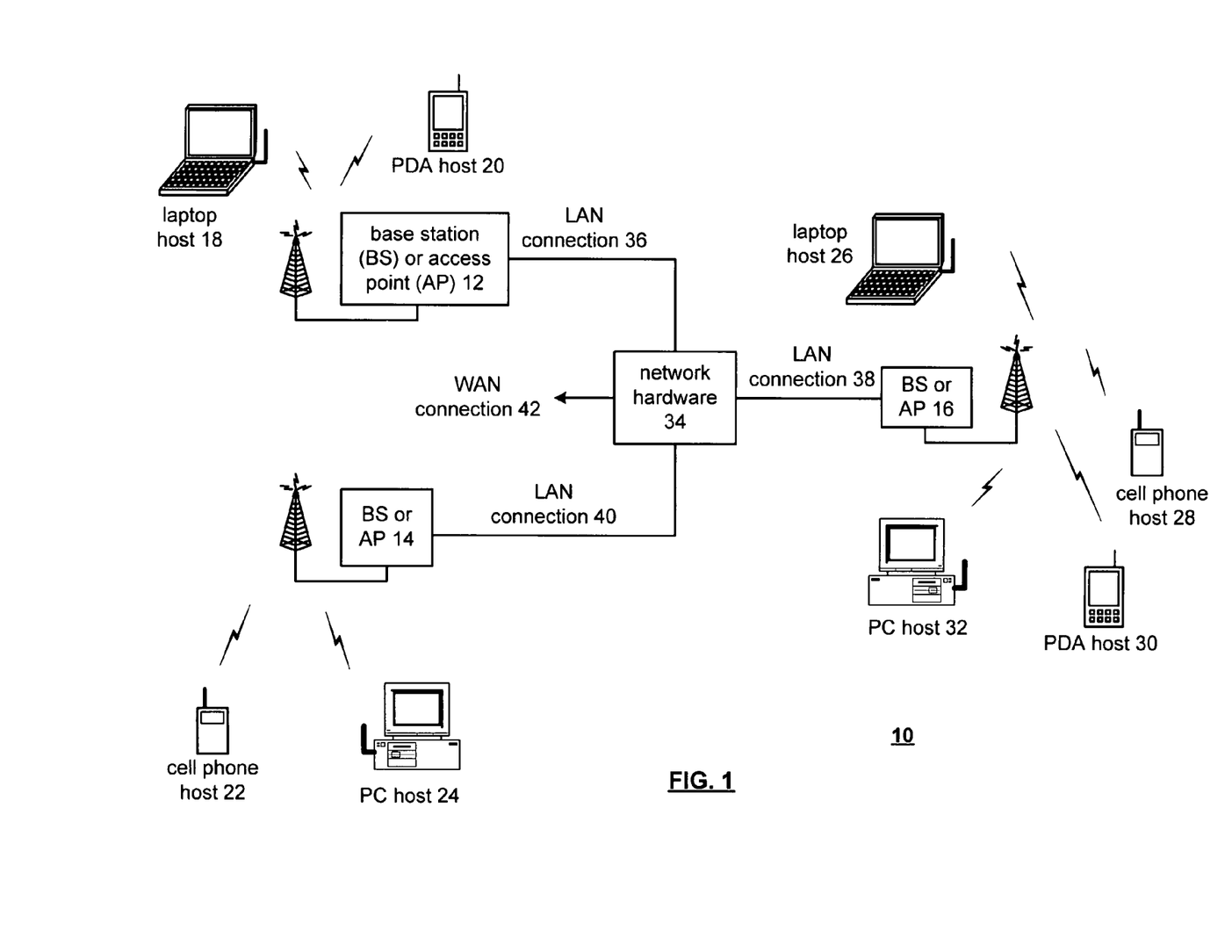
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-12.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
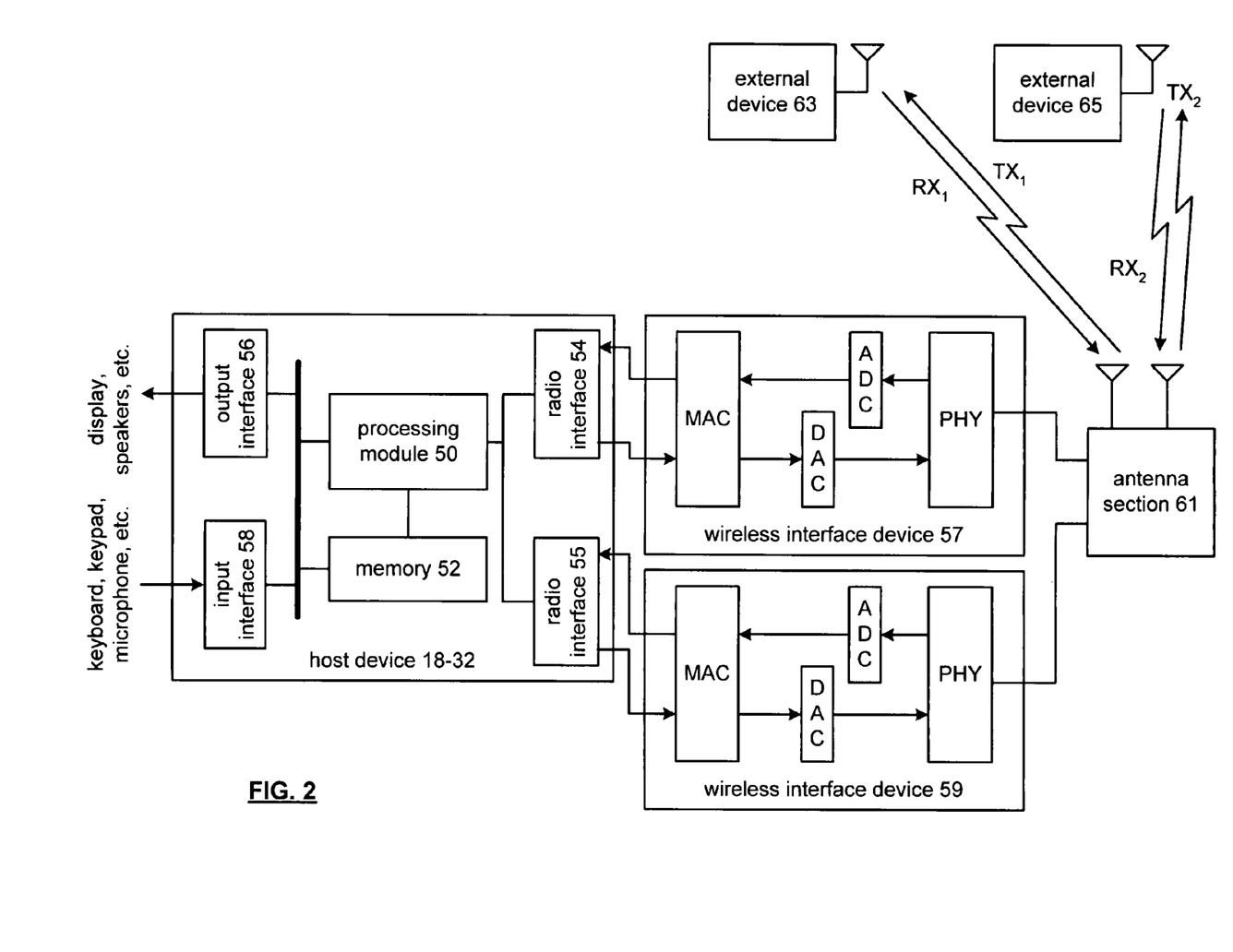
FIG. 2 is a schematic block diagram of a wireless communication device in accordance with the present invention.

FIG. 2 is a schematic block diagram illustrating a wireless communication device that includes the host device, or module, 18-32 and at least two wireless interface devices, or radio transceivers, 57 and 59. The wireless interface devices may be built in components of the host device 18-32 or externally coupled components. As illustrated, the host device 18-32 includes a processing module 50, memory 52, radio interfaces 54 and 55, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interfaces 54 and 55 each include a media-specific access control protocol (MAC) layer module, a digital-to-analog converter (DAC), an analog to digital converter (ADC), and a physical layer module (PHY). The radio interfaces 54 and 55 allow data to be received from and sent to external devices 63 and 65 via the wireless interface devices 57 and 59. Each of the external devices includes its own wireless interface device for communicating with the wireless interface device of the host device. For example, the host device may be personal or laptop computer, the external device 63 may be a headset, personal digital assistant, cellular telephone, printer, fax machine, joystick, keyboard, or desktop telephone, and the second external device 65 may be an access point of a wireless local area network. In this example, the external device 63 would include a Bluetooth wireless interface device, external device 65 would include an IEEE 802.11 wireless interface device, and the computer would include both types of wireless interface devices.

In operation, to avoid interference between the two or more wireless interface devices 57 and 59 of the wireless communication device, the MAC layer modules of each wireless interface device 57 and 59 communicate with each other to avoid concurrent transmission and/or reception of wireless transmissions with the corresponding external device if such concurrent transmission or reception would cause interference. The methods in which the MAC layer modules communicate are illustrated in FIGS. 6-12.

For data received from one of the wireless interface devices 57 or 59 (e.g., inbound data), the radio interface 54 or 55 provides the data to the processing module 50 for further processing and/or routing to the output interface 56. The output interface 56 provides connectivity to an output display device such as a display, monitor, speakers, et cetera such that the received data may be displayed. The radio interfaces 54 and 55 also provide data from the processing module 50 to the wireless interface devices 57 and 59. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to one of the wireless interface devices 57 or 59 via the corresponding radio interface 54 or 55.

Figure 3:
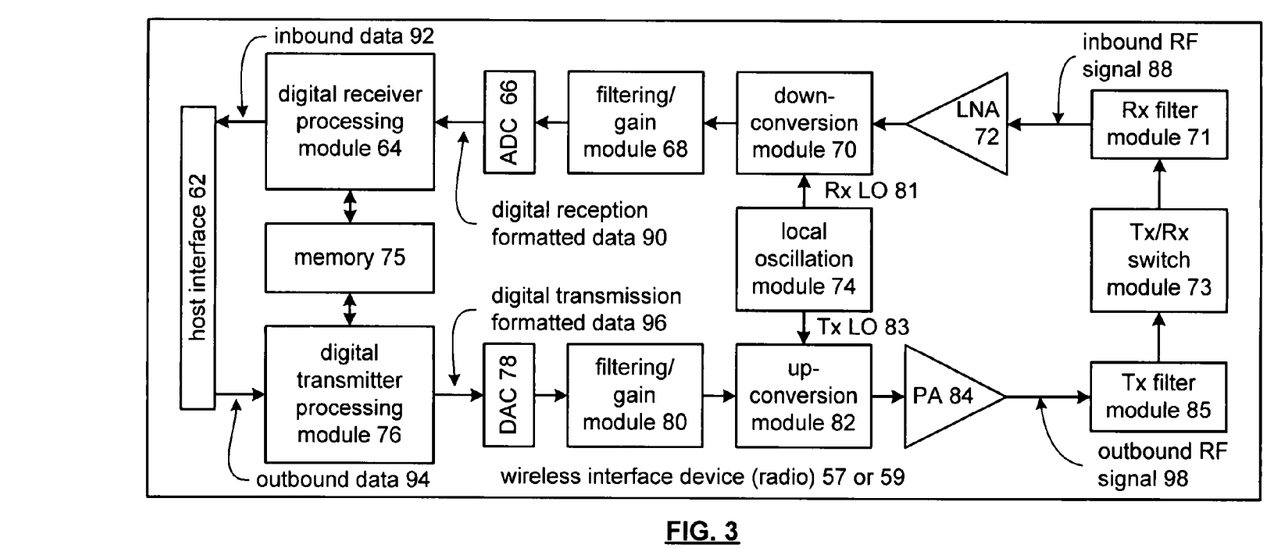
FIG. 3 is a schematic block diagram of a wireless interface device in accordance with the present invention.
Figure 4:
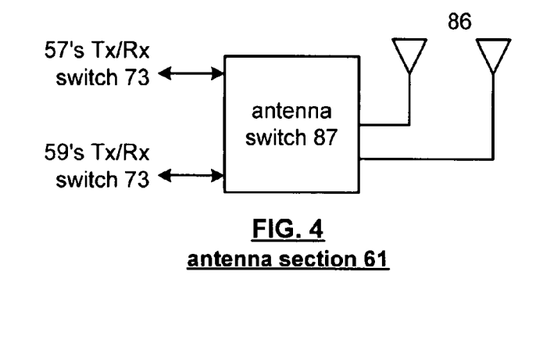
FIG. 4 is a schematic block diagram of an embodiment of an antenna section in accordance with the present invention.
Figure 5:
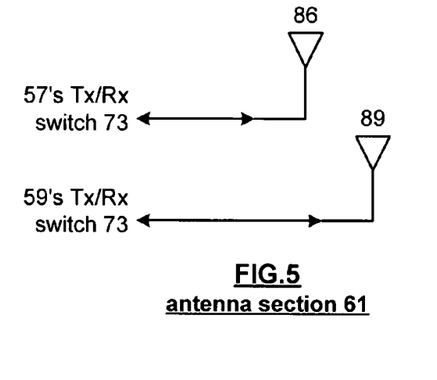
FIG. 5 is a schematic block diagram of another embodiment of an antenna section in accordance with the present invention.

FIG. 3 is a schematic block diagram of the wireless interface devices (i.e., a radio) 57 or 59, where each device includes a host interface 62, digital receiver processing module 64, an analog-to-digital converter (ADC) 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, an IF mixing up conversion stage 82, a power amplifier 84, and a transmitter filter module 85. The transmitter/receiver switch 73 is coupled to the antenna section 61, which may include two antennas 86 and an antenna switch 87 (as shown in FIG. 4) that is shared by the two wireless interface devices and is further shared by the transmit and receive paths as regulated by the Tx/Rx switch 73. Alternatively, the antenna section 61 may include separate antennas for each wireless interface device (as shown in FIG. 5), where the transmit path and receive path of each wireless interface device shares the antenna. Still further, the antenna section 61 may include a separate antenna for the transmit path and the receive path of each wireless interface device. As one of average skill in the art will appreciate, the antenna(s) may be polarized, directional, and be physically separated to provide a minimal amount of interference.

Returning to the discussion of FIG. 3, the digital receiver processing module 64 the digital transmitter processing module 76, and the memory 75 may be included in the MAC module and execute digital receiver functions and digital transmitter functions in accordance with a particular wireless communication standard. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the wireless interface device 57 or 59 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 -including all current and future subsections-, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna section 61 transmits the outbound RF signal 98 to a targeted device such as a base station, an access point and/or another wireless communication device.

The wireless interface device 57 or 59 also receives an inbound RF signal 88 via the antenna section 61, which was transmitted by a base station, an access point, or another wireless communication device. The antenna section 61 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antennas 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 6:
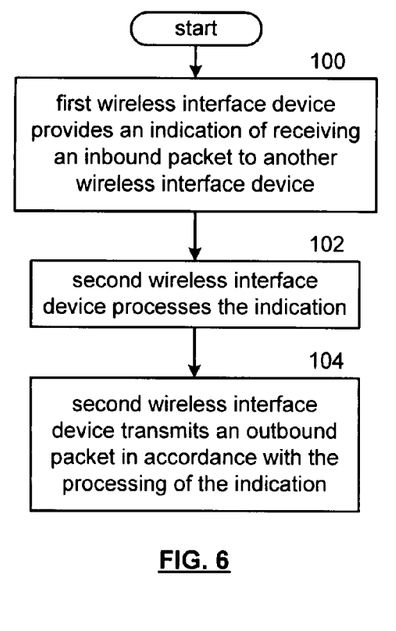
FIG. 6 is a logic diagram of a method for cooperative transceiving between wireless interface devices of a host device in accordance with the present invention.

FIG. 6 is a logic diagram of a method for cooperative transceiving between wireless interface devices of a host device. The method begins at step 100, where one of the wireless interface devices provides an indication of receiving an inbound packet to another one of the wireless interface devices. For example, one of the wireless interface devices transceives data packets in accordance with a Bluetooth standard while the other wireless interface devices transceives data packets in accordance with an IEEE 802.11 standard.

The method then proceeds to step 102, where the other wireless interface device processes the indication. The method then proceeds to step 104, where the other wireless interface device transmits an outbound packet in accordance with the processing of the indication. For example, the processing may be done to determine when the first wireless interface device is receiving the inbound packet. If so, the other wireless interface device delays transmitting the outbound packet until the one of the wireless interface devices has received the inbound packet. Note that to minimize the time that one wireless interface device is receiving packets, and hence reduce the wait time, the packet size of inbound packets and outbound packets may be optimized in accordance with the particular wireless communication standard.

As a further example of steps 102 and 104, the processing of the indication may be to determine whether the transmitting of the outbound packet would interfere with the receiving of the inbound packet. If so, the other wireless interface device delays transmitting the outbound packet until the one of the wireless interface devices has received the inbound packet. If the transmitting of the outbound packet would not interfere with the receiving of the inbound packet, the other wireless interface device transmits the outbound packet while the inbound packet is being received. Note that to reduce interference; the wireless interface device that is compliant with the Bluetooth standard may adaptively adjust its frequency hopping sequence to reduce interference with the other wireless interface device.

Figures 7, 8:
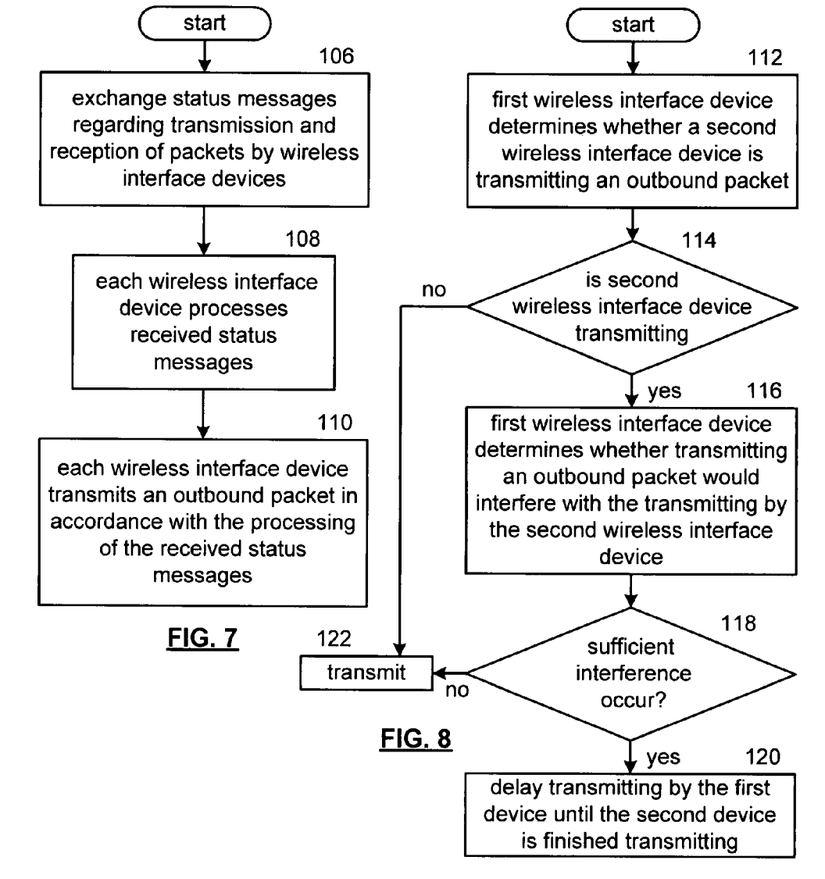
FIG. 7 is a logic diagram of another method for cooperative transceiving between wireless interface devices of a host device in accordance with the present invention.
FIG. 8 is a logic diagram of yet another method for cooperative transceiving between wireless interface devices of a host device in accordance with the present invention.

FIG. 7 is a logic diagram of another method for cooperative transceiving between wireless interface devices of a host device. The process begins at step 106, where the wireless interface devices exchange status messages regarding transmission and reception of packets. Note that a status message may be provided in response to a request from the other wireless communication device for a particular piece of information, for a full status report, or any portion thereof. The method then proceeds to step 108, where each of the wireless interface devices process the received status messages. The method then proceeds to step 110, where each of the wireless interface devices transmits an outbound packet in accordance with the processing of the received status messages.

In one example of the processing of the status message and transmitting of the outbound packet, the wireless interface device determines that the other wireless interface device is currently receiving an inbound packet. In this situation, the wireless interface devices delays transmitting of the outbound packet until the other wireless interface device has received the inbound packet.

In another example of the processing of the status message and transmitting of the outbound packet, the wireless interface device determines that the other wireless interface device is expecting to receive an inbound packet. In this situation, the wireless interface device delays transmitting of the outbound packet until the other wireless interface device has received the inbound packet unless the delay would cause an interrupt for low latency real time transmissions.

In yet another example of the processing of the status message and transmitting of the outbound packet, the wireless interface device determines that the other wireless interface device is transmitting an outbound message. In this situation, the wireless interface device delays transmitting of the outbound packet until the other wireless interface device has transmitted the inbound packet unless interference would be minimal or if a delay would cause an interrupt for low latency real time transmissions.

In a further example of the processing of the status message and transmitting of the outbound packet, the wireless interface device determines that the other wireless interface device is expecting to transmit another outbound message. In this situation, the wireless interface device randomizing the delaying transmitting the outbound packet in accordance with a random transmission protocol. For example, each wireless interface device may be assigned a unique wait period when they detect that two or more wireless interface devices desire to transmit a packet at about the same time.

FIG. 8 is a logic diagram of yet another method for cooperative transceiving between wireless interface devices of a host device. The method begins at step 112 where a first wireless interface device determines whether a second wireless interface device is transmitting an outbound packet. If, as established at step 114, the second wireless interface device is not transmitting, the method precedes to step 122, where the first wireless interface device transmits its packet. If, however, the second wireless interface device is transmitting, the method precedes to step 116, where the first wireless interface device determines whether transmitting its outbound packet would interfere with the transmitting of the second outbound packet. This may be done by comparing the transmit power level of the first wireless interface device with the transmit power level of the second wireless interface device. If they are similar and relatively low, the interference may be minimal.

The method then proceeds to step 118 where a determination is made as to whether the interference is of a level that would jeopardize the integrity of the second outbound packet. If not, the method precedes to step 122, where the packet is transmitted. If, however, there would be sufficient interference, the method precedes to step 120 where the first wireless interface device delays transmitting the first outbound packet until the second outbound packet has been transmitted.

Figure 9:
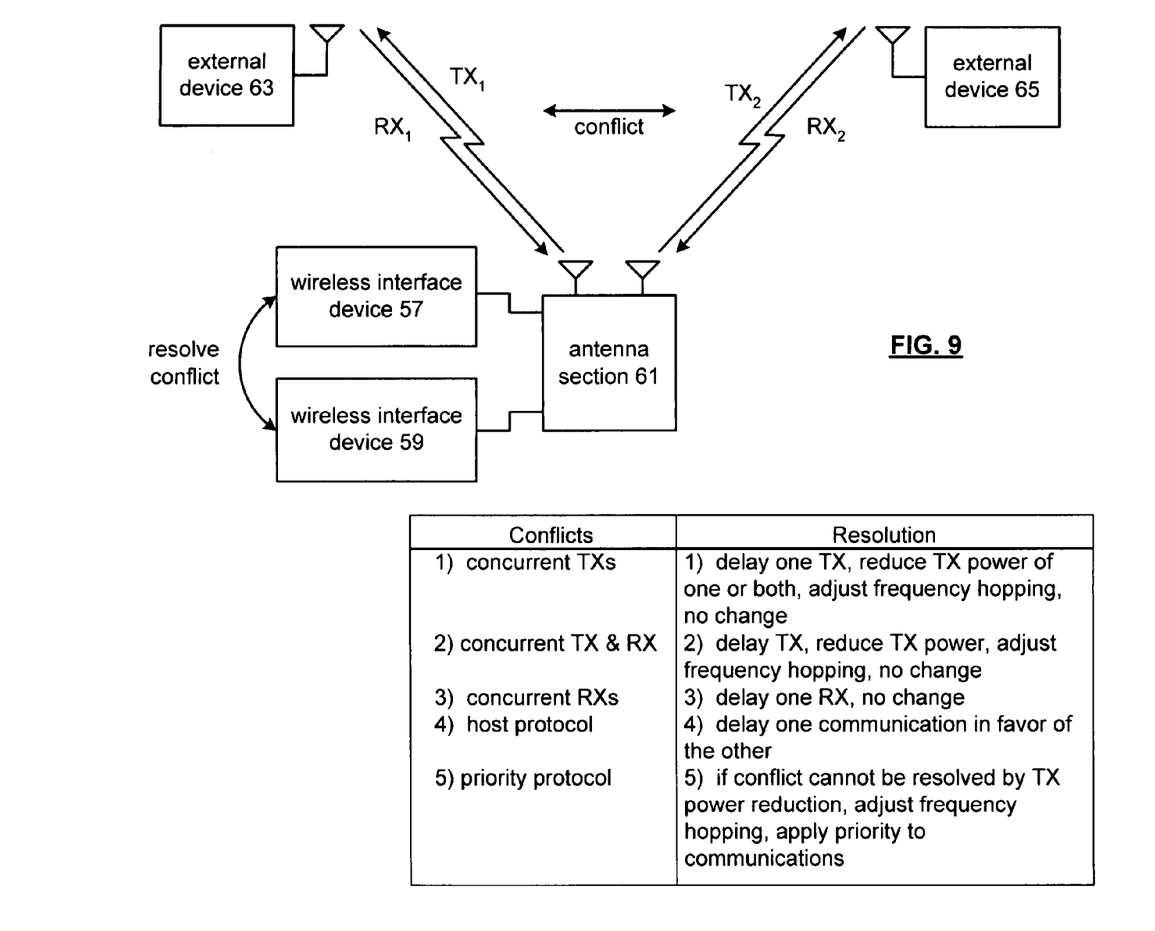
FIG. 9 is a diagram illustrating cooperative transceiving between wireless interface devices of a host device in accordance with the present invention.

FIG. 9 is a diagram illustrating wireless interface devices 57 and 59 associated with a host device 18-32 coordinating communications with two external wireless devices 63 and 65. The wireless interface devices 57 and 59 and the external wireless devices 63 and 65 may communication using any type of standardized wireless communication including, but not limited to, IEEE 822.11(a), (b), or (g), Bluetooth, GSM, CDMA, TDMA, LMPS, or MMPS. The external devices 63 and 65 may use the same or different wireless communication standard. When the external devices 63 and 65 use standards that occupy the same or similar frequency spectrums, a conflict between concurrent communications may occur. In other words, when the both external devices are communicating with the wireless interface devices 57 and 59 their respective communications may interfere with the other's communication, reducing the quality of service for one or both communications.

To resolve the conflict, as will be described in greater detail with reference to FIG. 12, the wireless interface devices 57 and 59 coordinate the communications with their respective external devices 63 and 65. As shown in the accompanying table of FIG. 9, when a conflict arises, the wireless interface devices 57 and 59 have a multitude of resolutions. For example, when both wireless interface devices 57 and 59 desire to concurrently transmit packets to their respective external devices 63 and 65 (i.e., concurrently includes any overlap of transmission), the wireless interface devices 57 and 59 determine whether a concurrent transmission would cause sufficient interference that would degrade one or both of the transmissions. If not, the resolution is to do nothing and concurrently transmit.

If, however, sufficient interference would exist, the wireless interface devices may delay one of the transmissions with respect to the other to avoid concurrent transmissions, reduce the transmit power for one or both of the concurrent transmissions, and/or adjust the frequency hopping of a Bluetooth compliant wireless interface device 57 or 59. The wireless interface devices 57 and 59 may delay the transmissions based on a priority protocol, a host protocol, a default mechanism, an ad hoc mechanism, or a user defined ordering. In essence, the delaying of the concurrent transmissions removes the concurrency such that only one transmission is occurring at any given time. The delaying may be established by an equal or imbalanced staggering of the transmissions or by allowing one of the communications to complete before the other is serviced. For example, the host protocol may prohibit concurrent communications. As such, the communication with one of external devices that was initiated first will be completed before communication with the other external devices is serviced.

As a further example of the delaying of concurrent transmissions, the priority protocol may dictate that user interface wireless devices (e.g., wireless keyboard, mouse, etc.) may have priority over data transfer peripheral wireless devices (e.g., PDA, down loading data to a cell phone, a printer, etc.). The priority protocol may also prioritize real time communications (e.g., voice, audio, and/or video data) over data transfer communications. In addition, the priority protocol may indicate whether the concurrent transmissions are to be staggered or sequential.

The user defiled priority list may be based on the type of external devices. For example, the user may priority communications with his or her PDA over any other type of communications, followed by communications with the cell phone, etc. In this manner, the conflict resolution may be customized to the user's preferences.

When the conflict corresponds to one wireless interface device potentially transmitting data while the other wireless interface device is potentially receiving data, the wireless interface devices determine whether concurrent transmission and reception would cause significant interference. If not, the current transmission and reception is performed. If, however, significant interference would be produced, the wireless interface device may resolve the conflict by delaying the transmission to avoid the concurrency, delaying the reception to avoid the concurrency, reducing the transmit power, adjusting the frequency hopping of a Bluetooth device, process the conflict based on the host protocol and/or based on the priority protocol.

When the conflict corresponds to concurrent receptions, the wireless interface devices determine whether such concurrency would cause significant interference. If not, the concurrent receptions are processed. If, however, significant interference would exist, one of the receptions may be delayed to avoid the concurrency, one of the external devices may be instructed to reduce its transmitting power.

Figure 10:
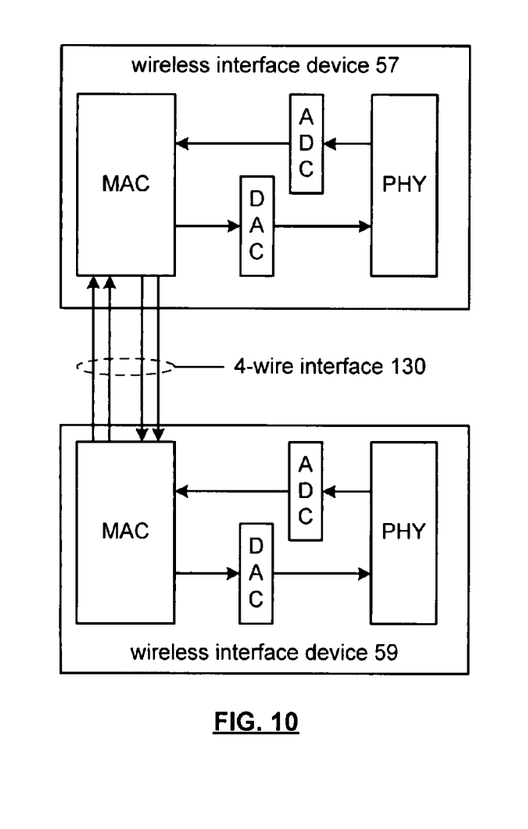
FIG. 10 is a schematic block diagram of a 4-wire interface between wireless interface devices in accordance with the present invention.

FIG. 10 is a schematic block diagram of a 4-wire interface 130 coupling the MAC modules of the wireless interface devices 57 and 59. As coupled, two of the four wires are used by the MAC of wireless interface device 59 to assert a priority level of an atomic sequence, or fragment thereof, that it is processing and the other two wires are used by the MAC of wireless interface device 57 to assert a priority level of an atomic sequence, or fragment thereof, that it is processing. Each of the MACs senses the priority level of the other and performs a conflict resolution function as illustrated in FIG. 12. The priority on the two lines of a corresponding MAC may be as follows:

| [1:0] | Priority level |
|---|---|
| 11 | Level 0 |
| 10 | Level 1 |
| 01 | Level 2 |
| 00 | Level 3 |

In this prioritization table, level 0 is the highest priority level and level 3 is the lowest. As one of average skill in the art will appreciate, more priority levels may be obtained by increasing the number of wires in the interface between the MACs of the wireless interface devices 57 and 59.

Figure 11:
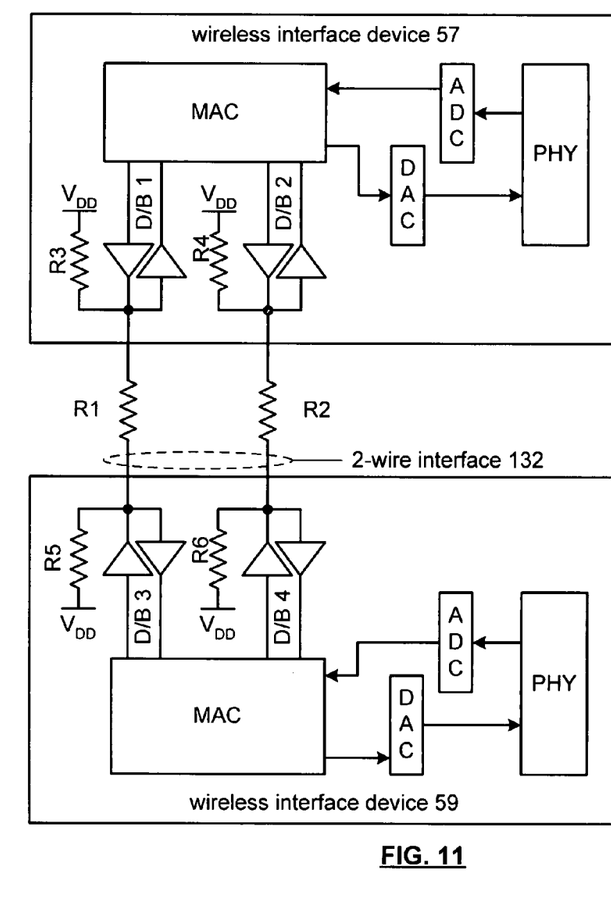
FIG. 11 is a schematic block diagram of a 2-wire interface between wireless interface devices in accordance with the present invention.

FIG. 11 is a schematic block diagram of a 2-wire 528 interface 132 coupling the MAC modules of the wireless interface devices 57 and 59. In this embodiment, each of the two wires includes a coupling resistor R1 or R2, pull up resistors R3, R5 or R4, R6, and two transceive driver/buffer pairs D/B1, D/B3 or D/B2, D/B4. In this embodiment, the wireless interface devices 57 and 59 share the two-wire interface to exchange priority level information. As such, the priority level is established to allow higher priorities to supercede lower priorities on the two-wire interface. In one embodiment, the priority levels may be established as follows:

| [1:0] | Priority level |
|---|---|
| 00 | Level 0 |
| 01 | Level 1 |
| 10 | Level 2 |
| 11 | Level 3 |

In this prioritization table, level 0 is the highest priority level and level 3 is the lowest. As one of average skill in the art will appreciate, more priority levels may be obtained by increasing the number of wires in the interface between the MACs of the wireless interface devices 57 and 59.

Figure 12:
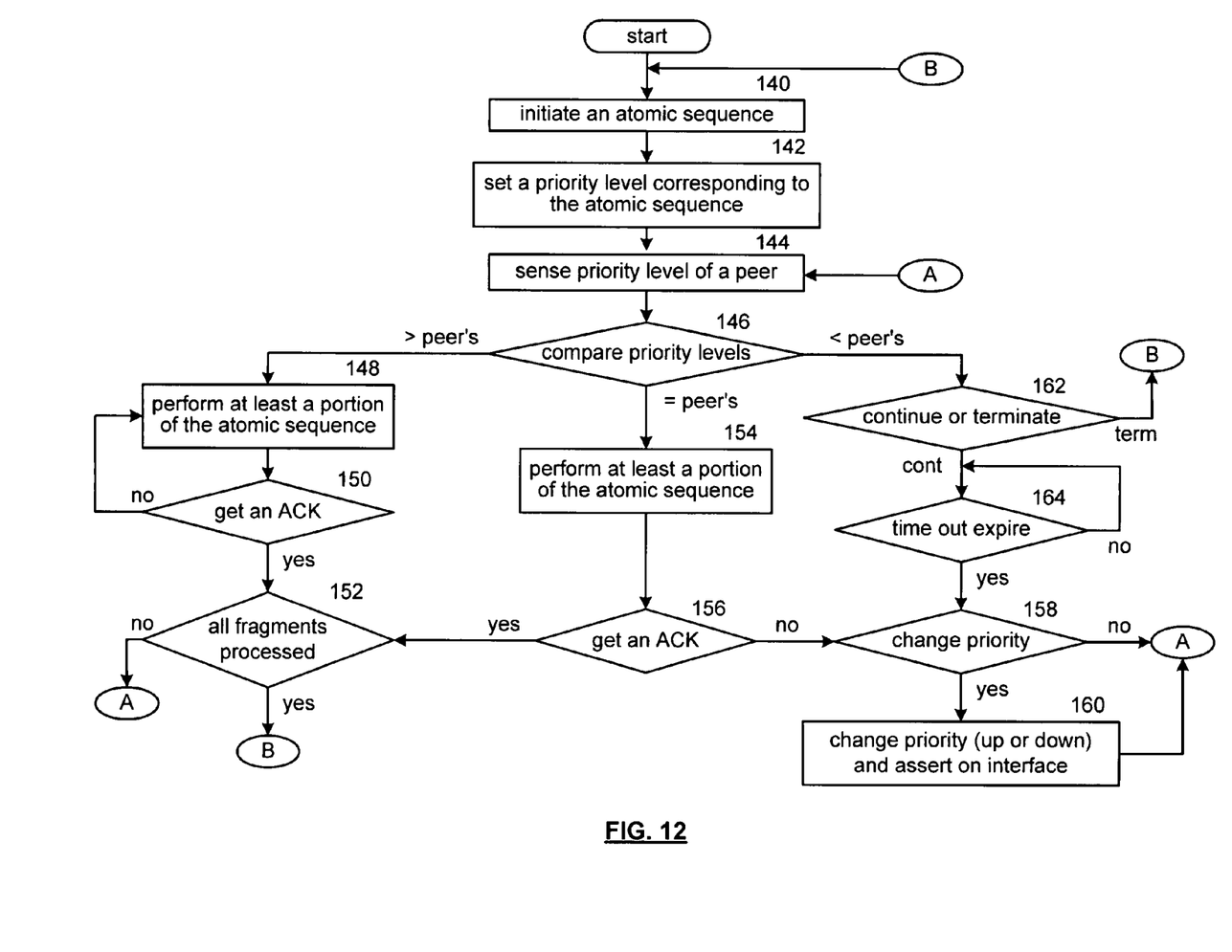
FIG. 12 is a logic diagram of a method for peer to peer wireless communication conflict resolution in accordance with the present invention.

FIG. 12 is a logic diagram of a method for use by one peer (e.g., device 57 or 59) of peer wireless interfaces devices of a wireless communication device to cooperatively provide wireless communications in a multiple wireless communication environment with other peers of the peer wireless interface devices. The process begins at step 140 where the wireless communication device initiates an atomic sequence of a plurality of atomic sequences. An atomic sequence relates particularly to the transceiving that is/will be performed by the wireless interface devices 57 and 59. According to the present invention, however, certain atomic sequences must have higher priority in transceiving operations and such, in some operations, only one of the wireless interface devices 57 and 59 may transceive during a particular period of time. Examples of such atomic sequence operations includes, but are not limited to, Bluetooth Sniff slots for Human Interface Device (HID) devices, IEEE 802.11 beacon operations, IEEE 802.11 high Quality of Service (QoS) operations, Bluetooth Park beacon operations, and Bluetooth Audio transmissions.

As one of average skill in the art will appreciate, an atomic sequence may include more than 1 TX/RX exchange. Examples of this are: (1) Page Scan: each $T_{w\_page\_scan}$ is considered one atomic sequence. For the case of R0 page scan, the page scan should be broken into multiple page scan windows, with the collaboration algorithm run at the start of each scan window. (2) Inquiry Scan: $T_{w\_inquiry\_scan}$ is considered one atomic sequence. (3) Page response: The atomic sequence will only expire on connection completion or a timeout. (4) Return from Hold/Un-Park, HID sniff: The atomic sequence does not end until an error free packet is received from the HID device or Sniff attempt or Sniff timeout expires.

| Bluetooth Function | Priority | comment |
|---|---|---|
| Page Scan (R0) | Level3 | Use the dead time between WLAN activity |
| Page scan (R1), Tpage scan <200 ms | Level2 | Contend with normal WLAN traffic |
| Page Scan (R1), Tpage_scan > 200 ms | Level1 | |
| Page Scan (R2) | Level1 | |
| Page Response | Level0 | Would be a waste to abort an ongoing connection establishment |
| Inquiry | Level3 | Use the dead time between WLAN activity |
| Inquiry Scan | Level2 | |
| Inquiry Response | Level1 | |
| Park Beacon | Level0 | |
| Return from Hold | Level0 | |
| Master-Slave Switch | Level1 | |
| Return from Park | Level1 | |
| ACL data | Level1 | |
| ACL data (Tpoll expiration) | Level2 | |
| SCO | Level3 | |
| HID active sniff slot | Level3 | |
| HID low-power sniff slot | Level3 | |

Note that to provide a large amount of contiguous inactive slots, the Sniff period of the Keyboard should be an integer multiple of the mouse sniff period and the Sniff instances must be offset by only one frame. At the sniff interval, after receiving the first packet from the HID (Human Interface Device) device without error, the priority level for the sniff timeout period should be lowered to level 2 since any other packets from the HID device are not as time critical. When requesting a shorter sniff interval, due to mouse/keyboard activity, the LMP (Link Manager Protocol) should be transmitted first, i.e. at the first reception of the master packet the LMP is transmitted.

Continuing with the logic diagram of FIG. 12, the process proceeds to step 142 where the wireless interface devices sets a priority level corresponding to the atomic sequence to produce a corresponding priority level. In one embodiment, the wireless interface device asserts the given priority for the atomic sequence on the BT_SP pins at least one half slot earlier than the first slot of the atomic sequence. This may be done using a 2-wire interface or a 4-wire interface. With the four-wire interface, four pins are used, where BT_SP[1:0] pins are defined as two output signals from the wireless interface device 57, e.g., Bluetooth device, to indicate a priority of its present atomic sequence. WLAN_SP[1:0] pins are defined as two output signals from the wireless interface device 59, e.g., WLAN device, to indicate a priority of its present atomic sequence. Thus, each of wireless interface devices 57 and 59 receive priority data from the other of the wireless interface device. The priority of these pins is described in Table 1 as:

| Xx_SP[1:0] | Priority level |
|---|---|
| 11 | Level 0 |
| 10 | Level 1 |
| 01 | Level 2 |
| 00 | Level 3 |

Note that level3 priority is essentially no atomic sequence in progress.

With the 2-wire interface, the interface includes a 2-pin design that uses an open drain output for the BT_SP and WLAN_SP pins. In this configuration the BT_SP and WLAN_SP signals are defined as COEX_SP[1:0]. COEX_SP[1:0] are individually pulled-up to $V_{DD}$ using a pull-up resistor (as shown in FIG. 11). Each of the wireless interface devices 57 and 59 shall assert a '1' on COEX_SP pin by allowing the output to go to high impedance. The pull-up resistors on COEX_SP will pull these signals to $V_{DD}$. A device shall assert a '0' on COEX_SP pin by driving the pin to ground.

The priority level signal is redefined as:

| COEX_SP[1:0] | Priority level |
|---|---|
| 00 | Level 0 |
| 01 | Level 1 |
| 10 | Level 2 |
| 11 | Level 3 |

The re-definition of the priority levels is to assure that at lowest priority the COEX_SP pins would be at high impedance.

Continuing with the logic diagram of FIG. 12, the process continues at step 144 where the wireless interface device senses the priority level of the other peer wireless interface device to produce a sensed priority level. For example, wireless interface device 57 senses the priority of wireless interface device 59 and vice versa. The sensing is done via the 4-wire interface or the 2-wire interface. The process continues at step 146 where the wireless interface device compares the sensed priority level with the corresponding priority level. With a 4-wire interface, the comparing is done at the start of an atomic sequence by checking the Xx_SP [1:0] bits from its peer device and determining whether it can perform its transaction based on the following rules:

(1) If (peer Xx_SP[1:0]>local Xx_SP), defer atomic sequence to next time epoch.

(2) If (peer Xx_SP[1:0]<local Xx_SP), perform atomic sequence.

(3) If (peer Xx_SP[1:0]=local Xx_SP), with uniform probability of 50% (TBD) perform atomic sequence.

With a 2-wire interface, the comparing is at the start of an atomic sequence by de-asserting the priority level on the COEX_SP signals, checking the COEX_SP[1:0] setting from its peer device, and determining whether it can perform its transaction based on the following rules:

(1) If (peer COEX_SP[1:0]<local COEX_SP): Defer atomic sequence to next time epoch.
(2) If (peer COEX_SP[1:0]>local COEX_SP): perform atomic sequence.
(3) If (peer COEX_SP[1:0]=local COEX_SP): With uniform probability of 50% (TBD) perform atomic sequence.
(4) After determining its action for the present atomic sequence the device shall re-assert its priority level onto the COEX_SP pins.

Continuing with the logic diagram of FIG. 12, when the comparing of the sensed priority level with the corresponding priority level is favorable, the process proceeds to either step 148 or step 154. The process proceeds to step 148 when the comparison was favorable because the priority of wireless interface device is greater than the priority of its peer wireless interface device. At step 148, the wireless interface device performs at least a portion of the atomic sequence. Recall that an atomic sequence may include a plurality of fragments. The process then proceeds to step 150 where the wireless interface device determines whether it has received an acknowledgement of its performance of the at least a portion of the atomic sequence within a prescribed time period. If not, it re-performs the at least a portion of the atomic sequence. If it received the acknowledgement, the process continues to step 152 where the wireless interface device determines whether all of the fragments for this atomic sequence have been processed. If yes, the process continues at step 140 for another atomic sequence. If no, the process continues at step 144 for the remaining fragments of the atomic sequence.

If, at step 146, the comparison was favorable because the priority of wireless interface device is equal to the priority of its peer wireless interface device, the process proceeds to step 154. At step 154, the wireless interface device performs at least a portion of the atomic sequence. The process then proceeds to step 156 where the wireless interface device determines whether it has received an acknowledgement of its performance of the at least a portion of the atomic sequence within the prescribed time period. If it received the acknowledgement, the process continues to step 152 where the wireless interface device determines whether all of the fragments for this atomic sequence have been processed. If yes, the process continues at step 140 for another atomic sequence. If no, the process continues at step 144 for the remaining fragments of the atomic sequence.

If the wireless interface device did not receive the acknowledgement (which may be due to a conflict with the other peer wireless interface devices), the process proceeds to step 158 where the wireless interface device determines whether the priority of the at least a portion of the atomic sequence (e.g., a fragment of the atomic sequence) should be changed. Note that in certain circumstances an atomic sequence may be initiated at a given priority level, but due to the nature of the atomic sequence or the information it carries, it priority may increase or decrease with time. In this case the device is allowed to increase or decrease the priority of the atomic sequence and perform the rules above using the new priority level.

If, at step 158 the priority is not to be changed, the process continues at step 144 for the current portion of the atomic sequence. If, however, the priority is to be changed, the process proceeds to step 160 where the priority of the portion of the atomic sequence is changed. The process then continues at step 144 for the current portion of the atomic sequence with its new priority level.

If, at step 146, the comparison of the priority levels was unfavorable (e.g., the priority of the peer wireless interface device is greater than the present wireless interface device), the process proceeds to step 162. At step 162, the wireless interface device determines whether to continue with the current atomic sequence or terminate it. If the decision is to terminate, the process continues at step 140 for another atomic sequence. If the decision is to continue, the process proceeds to step 164 where the wireless interface device determines whether a wait period has expired. Once the wait period expires, the process proceeds to step 158 to determine whether the priority of the portion of the atomic sequence should be changed. If not, the process repeats at step 144 for the current portion of the atomic sequence. As one of average skill in the art will appreciate, the wait period is set in an effort to allow the conflict to pass. As one of average skill in the art will further appreciate, the change priority determination may precede the wait period determination when the peer's priority level is greater.

In general, the process of FIG. 12 enables a wireless interface device to perform the priority-based algorithm for every PDU (Protocol Data Units) making up a message. At the start of the message (e.g., an atomic sequence), the wireless interface device shall assert WLAN_SP signals to indicate the priority of the message, the WLAN does not need to de-assert the WLAN_SP signals until the last fragment of the message has been transmitted and acknowledged. Note that the parameter aFragmentThreshold is chosen such that the maximum fragment size during Bluetooth activity is less than 1.25 ms (e.g., 625 µsecs). This will ensure that in the worst case a single Bluetooth frame can be occupied with a message of lower priority.

The preceding discussion has presented a method and apparatus for cooperative transceiving between wireless interface devices of a host device. By enabling the wireless interface devices to communicate directly with each other, interference between them may be reduced and/or avoided. As one of average skill in the art will appreciate, other embodiments may be derived from the teachings of the present invention without deviating from the scope of the claims.

What is claimed is:

1. A method for use by one peer of peer wireless interfaces devices of a wireless communication device to cooperatively provide wireless communications in a multiple wireless communication environment with other peers of the peer wireless interface devices, the method comprises:
   initiating an atomic sequence of a plurality of atomic sequences;
   setting a priority level corresponding to the atomic sequence to produce a corresponding priority level;
   sensing priority level of at least one of the other peers to produce a sensed priority level;
   comparing the sensed priority level with the corresponding priority level; and
   when the comparing of the sensed priority level with the corresponding priority level is favorable, performing at least a portion of the atomic sequence.

2. The method of claim 1, wherein the performing the at least a portion of the atomic sequence comprises:
   determining whether all of fragments of the atomic sequence have been performed, wherein the atomic sequence includes a plurality of fragments;
   when not all of the fragments have not been performed, repeating the sensing the priority level of the at least one of the other peers, comparing the sensed priority with the corresponding priority level, and performing a next fragment of the atomic sequence when the comparing is favorable; and when all of the fragments have been performed:
  initiating another atomic sequence of the plurality of atomic sequences;
  setting another priority level corresponding to the another atomic sequence to produce another corresponding priority level;
  sensing priority level of at least one of the other peers to produce the sensed priority level;
  comparing the sensed priority level with the another corresponding priority level;
  when the comparing of the sensed priority level with the another corresponding priority level is favorable, performing at least a portion of the another atomic sequence.

3. The method of claim 1 further comprises:
when the sensed priority level compares equally with the corresponding priority level, performing the at least a portion of the atomic sequence;
determining whether an acknowledgement is received within a given period of time for the at least a portion of the atomic sequence;
when the acknowledgement is received within the given period of time for the at least a portion of the atomic sequence, determining whether all of fragments of the atomic sequence have been performed, wherein the atomic sequence includes a plurality of fragments;
when not all of the fragments have not been performed, repeating the sensing the priority level of the at least one of the other peers, comparing the sensed priority with the corresponding priority level, and performing a next fragment of the atomic sequence when the comparing is favorable; and
when all of the fragments have been performed:
  initiating another atomic sequence of the plurality of atomic sequences;
  setting another priority level corresponding to the another atomic sequence to produce another corresponding priority level;
  sensing priority level of at least one of the other peers to produce the sensed priority level;
  comparing the sensed priority level with the another corresponding priority level;
  when the comparing of the sensed priority level with the another corresponding priority level is favorable, performing at least a portion of the another atomic sequence.

4. The method of claim 3 further comprises:
when the acknowledgement is not received within the given period of time for the at least a portion of the atomic sequence, determining whether priority level of the atomic sequence is to be changed;
when the priority level is not to be changed, sensing the priority level of the at least one of the other peers, comparing the sensed priority with the corresponding priority level, and re-performing the fragment of the atomic sequence when the comparing is favorable; and
when the priority level is to be changed:
  changing the priority level of the atomic sequence to produce a changed priority level;
  sensing the priority level of at least one of the other peers to produce the sensed priority level;
  comparing the sensed priority level with the changed priority level; and
  when the comparing of the sensed priority level with the changed priority level is favorable, re-performing the fragment of the atomic sequence.

5. The method of claim 1 further comprises:
when the comparing of the sensed priority level with the corresponding priority level is unfavorable, determining whether to terminate the atomic sequence or continue the atomic sequence;
when the atomic sequence is to be continued, waiting for expiration of a time out period;
when the time out period expires, determining whether to change priority level of the atomic sequence;
when the priority level is not to be changed, repeating the sensing the priority level of at least one of the other peers to produce a sensed priority level, comparing the sensed priority level with the corresponding priority level, and, when the comparing of the sensed priority level with the corresponding priority level is favorable, performing the at least a portion of the atomic sequence;
when the priority is to be changed:
  changing the priority level of the atomic sequence to produce a changed priority level;
  sensing the priority level of at least one of the other peers to produce the sensed priority level;
  comparing the sensed priority level with the changed priority level; and
  when the comparing of the sensed priority level with the changed priority level is favorable, performing the at least a portion of the atomic sequence.

6. The method of claim 5, wherein the determining whether to change priority level of the atomic sequence comprises at least one of:
determining information of the atomic sequence is time sensitive; and
determining type of the atomic sequence to be time sensitive.

7. The method of claim 1, wherein the setting a priority level corresponding to the atomic sequence comprises at least one of:
setting a lowest priority when the atomic sequence relates to a pre-communication state;
setting a second lowest priority when the atomic sequence relates to initiating a communication;
setting a second highest priority when the atomic sequence relates to communication set up; and
setting a highest priority when the atomic sequence relates to an ongoing communication.

8. A wireless communication device comprises:
a first wireless interface device operably coupled to provide a first type of wireless communication;
a second wireless interface device operably coupled to provide a second type of wireless communication;
an antenna section operably coupled to the first and second wireless interface devices; and
an interface coupling the first wireless interface device to the second interface device, wherein each of the first and second wireless interface devices assert a priority level of an atomic function to produce a corresponding priority level, wherein the first and second wireless interface devices resolve a conflict by:
  sensing priority level of the other wireless interface device on the interface to produce a sensed priority level;
  comparing the sensed priority level with the corresponding priority level; and
  when the comparing of the sensed priority level with the corresponding priority level is favorable, performing at least a portion of the atomic sequence.

9. The wireless communication device of claim 8, wherein the first type of wireless communication includes Bluetooth and the second type of wireless communication includes IEEE 802.11.

10. The wireless communication device of claim 8, wherein the interface comprises:
   a four wire interface, wherein two wires of the four wire interface carries the priority level of the first wireless interface device asserts and another two wires of the four wire interface carries the priority level of the second wireless interface device.

11. The wireless communication device of claim 8, wherein the interface comprises:
   a first resistor;
   a second resistor;
   a first transceive driver/buffer pair in the first wireless interface device, wherein the first transceive driver/buffer pair is coupled to a first node of the first resistor;
   a second transceive driver/buffer pair in the first wireless interface device, wherein the second transceive driver/buffer pair is coupled to a first node of the second resistor;
   a third transceive driver/buffer pair in the second wireless interface device, wherein the third transceive driver/buffer pair is coupled to a second node of the first resistor;
   a fourth transceive driver/buffer pair in the second wireless interface device, wherein the fourth transceive driver/buffer pair is coupled to a second node of the second resistor; and
   a plurality of pull up resistors operably coupled to the first, second, third, and fourth transceive driver/buffer pairs, wherein coupling via the first resistor provides a first line of a two-wire interface and coupling via the second resistor provides a second line of the two-wire interface.

12. The wireless communication device of claim 11, wherein the first and second wireless interface devices assert the priority level of the atomic function by:
   driving the first and second lines to a logic zero state for a highest priority level;
   driving the first line to a logic zero state and passively pulling up the second line to a logic one state for a second highest priority;
   passively pulling up the first line to a logic one state and driving the second line to a logic zero state for a third highest priority; and
   passively pulling up the first and second lines to a logic one state for a fourth highest priority.

13. The wireless communication device of claim 8, wherein the performing the at least a portion of the atomic sequence comprises:
   determining whether all of fragments of the atomic sequence have been performed, wherein the atomic sequence includes a plurality of fragments;
   when not all of the fragments have not been performed, repeating the sensing the priority level of the at least one of the other peers, comparing the sensed priority with the corresponding priority level, and performing a next fragment of the atomic sequence when the comparing is favorable; and
   when all of the fragments have been performed:
      initiating another atomic sequence of the plurality of atomic sequences;
      setting another priority level corresponding to the another atomic sequence to produce another corresponding priority level;
      sensing priority level of at least one of the other peers to produce the sensed priority level;
      comparing the sensed priority level with the another corresponding priority level;
      when the comparing of the sensed priority level with the another corresponding priority level is favorable, performing at least a portion of the another atomic sequence.

14. The wireless communication device of claim 8, wherein the resolving the conflict further comprises:
   when the sensed priority level compares equally with the corresponding priority level, performing the at least a portion of the atomic sequence;
   determining whether an acknowledgement is received within a given period of time for the at least a portion of the atomic sequence;
   when the acknowledgement is received within the given period of time for the at least a portion of the atomic sequence, determining whether all of fragments of the atomic sequence have been performed, wherein the atomic sequence includes a plurality of fragments;
   when not all of the fragments have not been performed, repeating the sensing the priority level of the at least one of the other peers, comparing the sensed priority with the corresponding priority level, and performing a next fragment of the atomic sequence when the comparing is favorable; and
   when all of the fragments have been performed:
      initiating another atomic sequence of the plurality of atomic sequences;
      setting another priority level corresponding to the another atomic sequence to produce another corresponding priority level;
      sensing priority level of at least one of the other peers to produce the sensed priority level;
      comparing the sensed priority level with the another corresponding priority level;
      when the comparing of the sensed priority level with the another corresponding priority level is favorable, performing at least a portion of the another atomic sequence.

15. The wireless communication device of claim 8, wherein the resolving the conflict further comprises:
   when the acknowledgement is not received within the given period of time for the at least a portion of the atomic sequence, determining whether priority level of the atomic sequence is to be changed;
   when the priority level is not to be changed, sensing the priority level of the at least one of the other peers, comparing the sensed priority with the corresponding priority level, and re-performing the fragment of the atomic sequence when the comparing is favorable; and
   when the priority level is to be changed:
      changing the priority level of the atomic sequence to produce a changed priority level;
      sensing the priority level of at least one of the other peers to produce the sensed priority level;
      comparing the sensed priority level with the changed priority level; and
      when the comparing of the sensed priority level with the changed priority level is favorable, re-performing the fragment of the atomic sequence.

16. The wireless communication device of claim 8, wherein the resolving the conflict further comprises:

when the comparing of the sensed priority level with the corresponding priority level is unfavorable, determining whether to terminate the atomic sequence or continue the atomic sequence;

when the atomic sequence is to be continued, waiting for expiration of a time out period;

when the time out period expires, determining whether to change priority level of the atomic sequence;

when the priority level is not to be changed, repeating the sensing the priority level of at least one of the other peers to produce a sensed priority level, comparing the sensed priority level with the corresponding priority level, and, when the comparing of the sensed priority level with the corresponding priority level is favorable, performing the at least a portion of the atomic sequence;

when the priority is to be changed:
   changing the priority level of the atomic sequence to produce a changed priority level;
   sensing the priority level of at least one of the other peers to produce the sensed priority level;
   comparing the sensed priority level with the changed priority level; and
   when the comparing of the sensed priority level with the changed priority level is favorable, performing the at least a portion of the atomic sequence.

17. The wireless communication device of claim 16, wherein the determining whether to change priority level of the atomic sequence comprises at least one of:
   determining information of the atomic sequence is time sensitive; and
   determining type of the atomic sequence to be time sensitive.

18. A two-wire interface comprises:
   a first resistor;
   a second resistor;
   a first transceive driver/buffer pair coupled to a first node of the first resistor;
   a second transceive driver/buffer pair coupled to a first node of the second resistor;
   a third transceive driver/buffer pair coupled to a second node of the first resistor;
   a fourth transceive driver/buffer pair coupled to a second node of the second resistor; and
   a plurality of pull up resistors operably coupled to the first, second, third, and fourth transceive driver/buffer pairs, wherein coupling via the first resistor provides a first line of the two-wire interface and coupling via the second resistor provides a second line of the two-wire interface.

19. The two-wire interface of claim 18, wherein priority levels are asserted on the two-wire interface by:
   driving the first and second lines to a logic zero state for a highest priority level;
   driving the first line to a logic zero state and passively pulling up the second line to a logic one state for a second highest priority;
   passively pulling up the first line to a logic one state and driving the second line to a logic zero state for a third highest priority; and
   passively pulling up the first and second lines to a logic one state for a fourth highest priority.

* * * * *

UNITED STATES PATENT AND TRADEMARK OFFICE
CERTIFICATE OF CORRECTION

PATENT NO.        : 7,295,528 B2                                              Page 1 of 1
APPLICATION NO.   : 10/770185
DATED             : November 13, 2007
INVENTOR(S)       : Ibrahim et al.

It is certified that error appears in the above-identified patent and that said Letters Patent is hereby corrected as shown below:

Front Page of Patent; Related U.S. Application Data after "Provisional application No. 60/469,983, filed May 13, 2003", please insert --and is a CIP of 10/387,249 03/12/2003--.

Signed and Sealed this

Fourth Day of November, 2008

JON W. DUDAS
*Director of the United States Patent and Trademark Office*